(12) United States Patent
Littlejohn et al.

(10) Patent No.: US 11,584,547 B2
(45) Date of Patent: Feb. 21, 2023

(54) FAIRING BOND FIXTURE

(71) Applicant: Sikorsky Aircraft Corporation, Stratford, CT (US)

(72) Inventors: David Littlejohn, Haslet, TX (US); Sven Roy Lofstrom, Irving, TX (US); Scott Oren Smith, Bedford, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 17/225,421

(22) Filed: Apr. 8, 2021

(65) Prior Publication Data

US 2021/0221537 A1 Jul. 22, 2021

Related U.S. Application Data

(62) Division of application No. 15/282,176, filed on Sep. 30, 2016, now Pat. No. 10,981,673.

(51) Int. Cl.
*B64F 5/10* (2017.01)
*B64C 27/46* (2006.01)
*B64F 5/40* (2017.01)

(52) U.S. Cl.
CPC .............. *B64F 5/10* (2017.01); *B64C 27/46* (2013.01); *B64F 5/40* (2017.01)

(58) Field of Classification Search
CPC .............. B64F 5/10; B64F 5/40; B64C 27/46
See application file for complete search history.

(56) References Cited

U.S. PATENT DOCUMENTS

| 4,855,011 | A | 8/1989 | Legge |
| 5,862,576 | A | 1/1999 | Leahy |
| 8,409,389 | B2 | 4/2013 | Jones |
| 8,800,145 | B2 | 8/2014 | Mukherji et al. |
| 9,381,699 | B2 | 7/2016 | Boschet et al. |
| 2017/0014975 | A1 | 1/2017 | Edge |

OTHER PUBLICATIONS

Notice of Allowance on U.S. Appl. No. 15/282,176 dated Dec. 23, 2020 (6 pages).
U.S. Final Office Action on U.S. Appl. No. 15/282,176 dated Dec. 17, 2019 (8 pages).
U.S. Final Office Action on U.S. Appl. No. 15/282,176 dated Dec. 19, 2018 (7 pages).
U.S. Non-Final Office Action on U.S. Appl. No. 15/282,176 dated Jun. 29, 2018 (8 pages).
U.S. Non-Final Office Action on U.S. Appl. No. 15/282,176 dated Jun. 6, 2020 (10 pages).
U.S. Non-Final Office Action on U.S. Appl. No. 15/282,176 dated May 15, 2019 (8 pages).

*Primary Examiner* — Moshe Wilensky
(74) *Attorney, Agent, or Firm* — Foley & Lardner LLP

(57) ABSTRACT

A bond fixture includes a support structure and a first assembly coupled to the support structure. The first assembly includes a frame defining a chamber and a first pressure pad and second pressure pad coupled to the frame opposite one another and positioned within the chamber. The second pressure pad is movable to control a pressure applied by the first pressure pad and the second pressure pad.

10 Claims, 8 Drawing Sheets

FAIRING BOND FIXTURE

CROSS-REFERENCE TO RELATED PATENT APPLICATIONS

This application is a divisional of U.S. patent application Ser. No. 15/282,176, filed Sep. 30, 2016, the contents of which are incorporated herein in their entirety by reference.

BACKGROUND OF THE INVENTION

Exemplary embodiments of the invention relate to rotary-wing aircraft and, more particularly, to a bond fixture for use during the manufacture or repair of a rotor blade of a rotary-wing aircraft.

Rotary wing aircraft include a plurality of main rotor blades coupled to a central hub. The rotor blades include aerodynamic surfaces that, when rotated, create lift. The configuration of the main rotor blades, particularly the leading edge thereof, is selected to enhance rotor blade performance, for example to increase the hover and lift capabilities of the rotary-wing aircraft. Rotor blades are subjected to high stresses and strains resulting from aerodynamic forces developed during operation.

BRIEF DESCRIPTION OF THE INVENTION

According to one embodiment of the invention, a bond fixture includes a support structure and a first assembly coupled to the support structure. The first assembly includes a frame defining a chamber and a first pressure pad and second pressure pad coupled to the frame opposite one another and positioned within the chamber. The second pressure pad is movable to control a pressure applied by the first pressure pad and the second pressure pad.

In addition to one or more of the features described above, or as an alternative, in further embodiments the frame includes a first support plate and a second support plate coupled by at least one connecting member.

In addition to one or more of the features described above, or as an alternative, in further embodiments the first pressure pad is fixedly mounted to the first support plate and the second pressure pad is movably coupled to the second support plate.

In addition to one or more of the features described above, or as an alternative, in further embodiments the second pressure pad is movably coupled to the second support plate via at least one fastener.

In addition to one or more of the features described above, or as an alternative, in further embodiments the at least one fastener is rotatable to adjust a position of the second pressure pad relative to the second support plate.

In addition to one or more of the features described above, or as an alternative, in further embodiments the first assembly is configured to apply pressure to a first fairing.

In addition to one or more of the features described above, or as an alternative, in further embodiments including a second assembly coupled to the support structure. The second assembly includes a frame defining a chamber, a first pressure pad and a second pressure pad coupled to the frame opposite one another and positioned within the chamber. The second pressure pad is movable to control a pressure applied by the first pressure pad and the second pressure pad of the second assembly.

In addition to one or more of the features described above, or as an alternative, in further embodiments the frame of the second assembly includes a first support plate and a second support plate coupled by at least one connecting member.

In addition to one or more of the features described above, or as an alternative, in further embodiments the first pressure pad of the second assembly is fixedly mounted to the first support plate of the second assembly and the second pressure pad of the second assembly is movably coupled to the second support plate of the second assembly.

In addition to one or more of the features described above, or as an alternative, in further embodiments the second pressure pad of the second assembly is movably coupled to the second support plate of the second assembly via at least one fastener.

In addition to one or more of the features described above, or as an alternative, in further embodiments the first assembly is configured to apply a pressure to a first fairing and the second assembly is configured to apply pressure to a second fairing simultaneously.

In addition to one or more of the features described above, or as an alternative, in further embodiments the first assembly is mounted to a first portion of the support structure and the second assembly is mounted to a second portion of the support structure such that the first assembly and the second assembly are arranged at an angle to one another.

In addition to one or more of the features described above, or as an alternative, in further embodiments the bond fixture is configured for use with a rotor blade.

In addition to one or more of the features described above, or as an alternative, in further embodiments the support structure is removably coupled to a blade cuff of the rotor blade to restrict movement of the bond fixture relative to the rotor blade.

According to another embodiment, a method of bonding a fairing to a rotor blade includes installing a first fairing to a surface of the rotor blade, positioning a first assembly of a bond fixture about the rotor blade adjacent the first fairing, connecting a support structure of the bond fixture to the rotor blade to restrict movement of the bond fixture relative to the rotor blade, adjusting a position of one or more pressure pads of the first assembly, and applying localized and constant pressure to the fairing via the bond fixture.

In addition to one or more of the features described above, or as an alternative, in further embodiments including installing a second fairing to another surface of the rotor blade, positioning a second assembly of a bond fixture about the rotor blade adjacent the second fairing, adjusting a position of one or more pressure pads of the second assembly, and applying localized and constant pressure to the fairing via the bond fixture.

In addition to one or more of the features described above, or as an alternative, in further embodiments localized and constant pressure is applied to the first fairing and the second fairing simultaneously.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
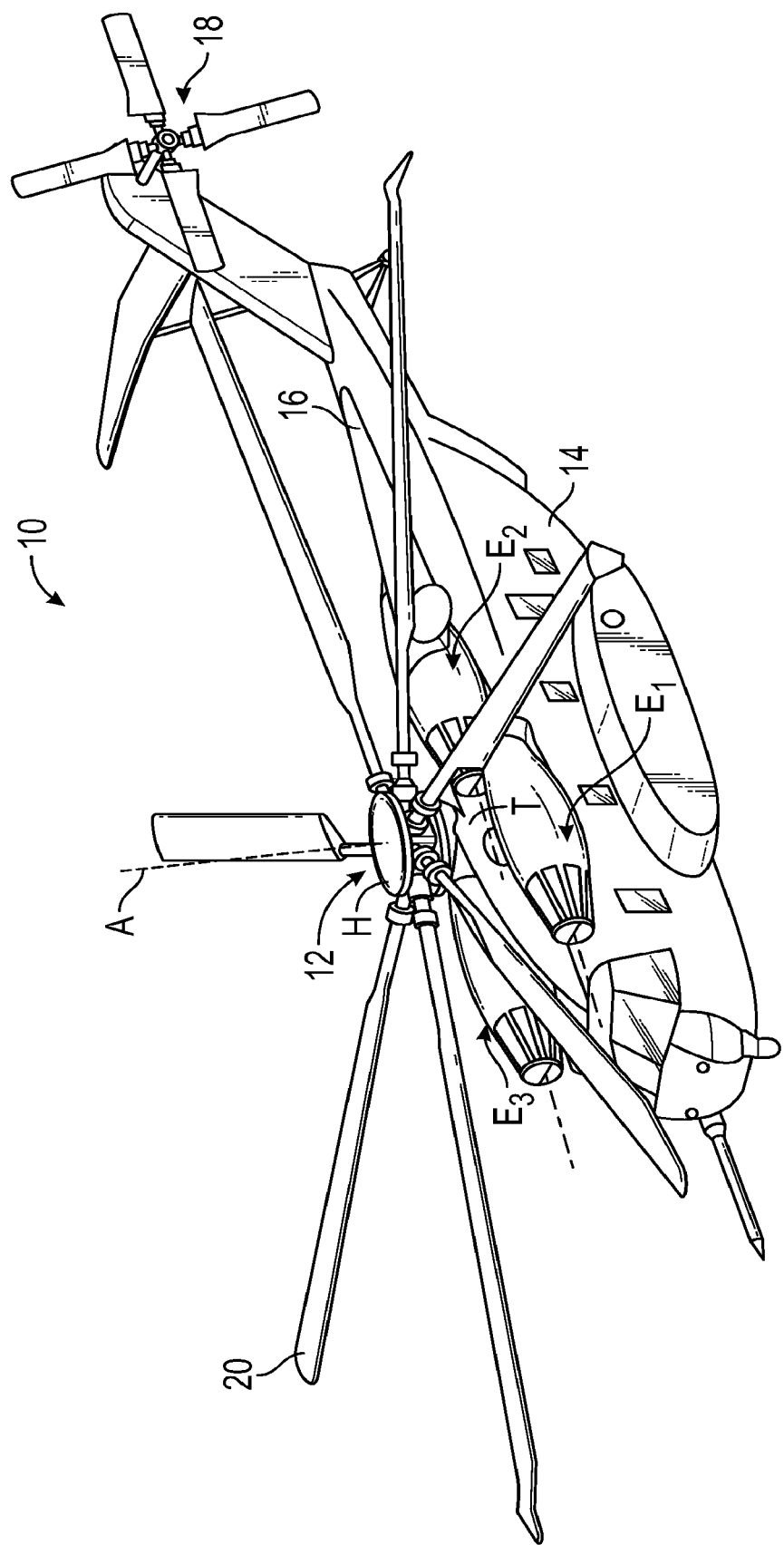
FIG. 1 is a perspective view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system for example. The main rotor assembly 12 is driven about an axis of rotation A through a main gearbox (illustrated schematically at T) by one or more engines E. The main rotor system 12 includes a plurality of rotor blade assemblies 20 mounted to a rotor hub assembly H. Although a particular helicopter configuration is illustrated and described in the disclosed non-limiting embodiment, other configurations and/or machines, such as high speed compound rotary-wing aircraft with supplemental translational thrust systems, dual contra-rotating, coaxial rotor system aircraft, turbo-props, tilt-rotors, and tilt-wing aircraft are also within the scope of the invention.

Figure 2:
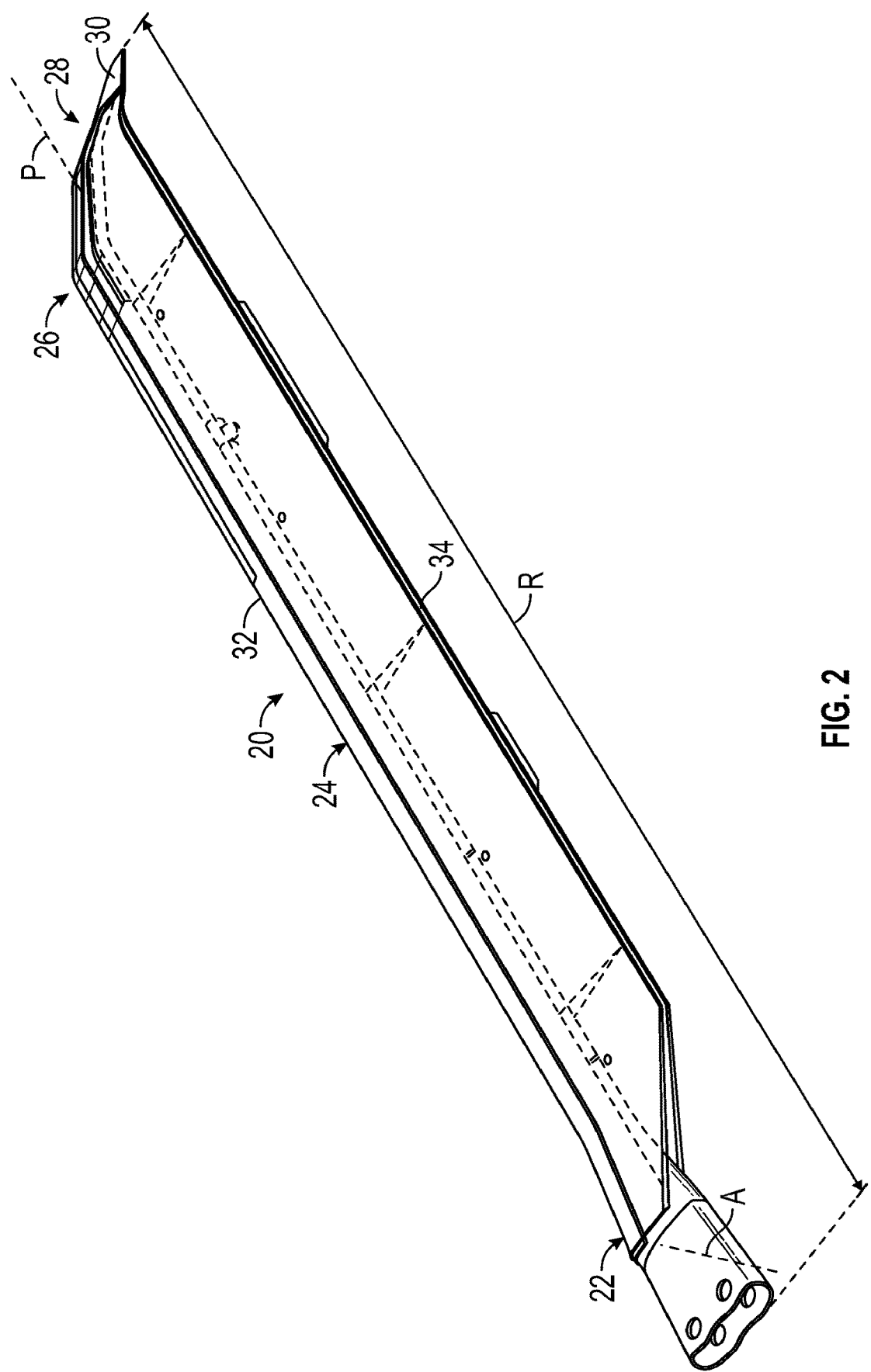
FIG. 2 is a perspective view of an example of a rotor blade of a rotary wing aircraft.
Figure 3:
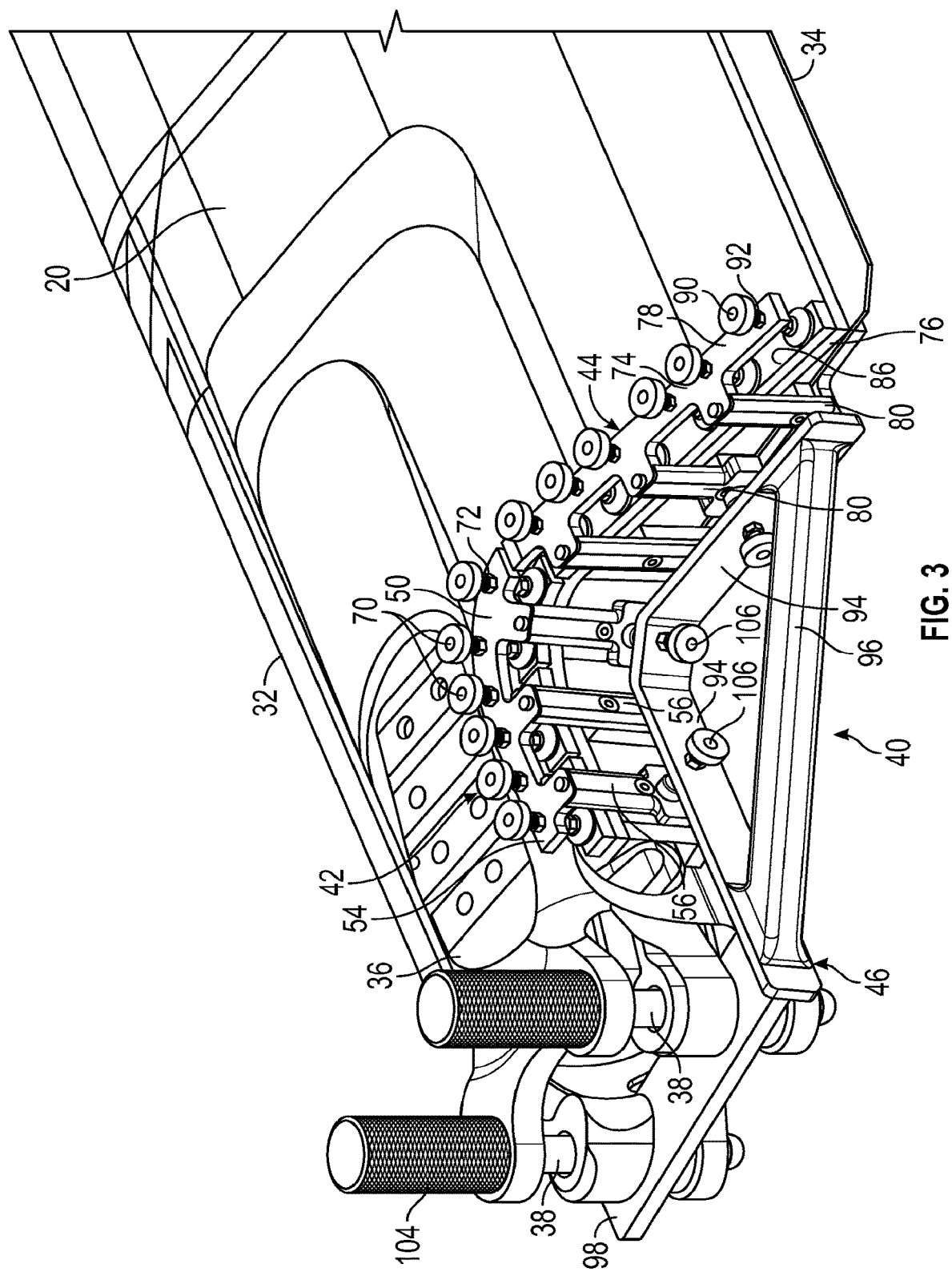
FIG. 3 is a perspective view of a bonding fixture for supporting a rotor blade during a machining operation according to an embodiment.
Figure 4:
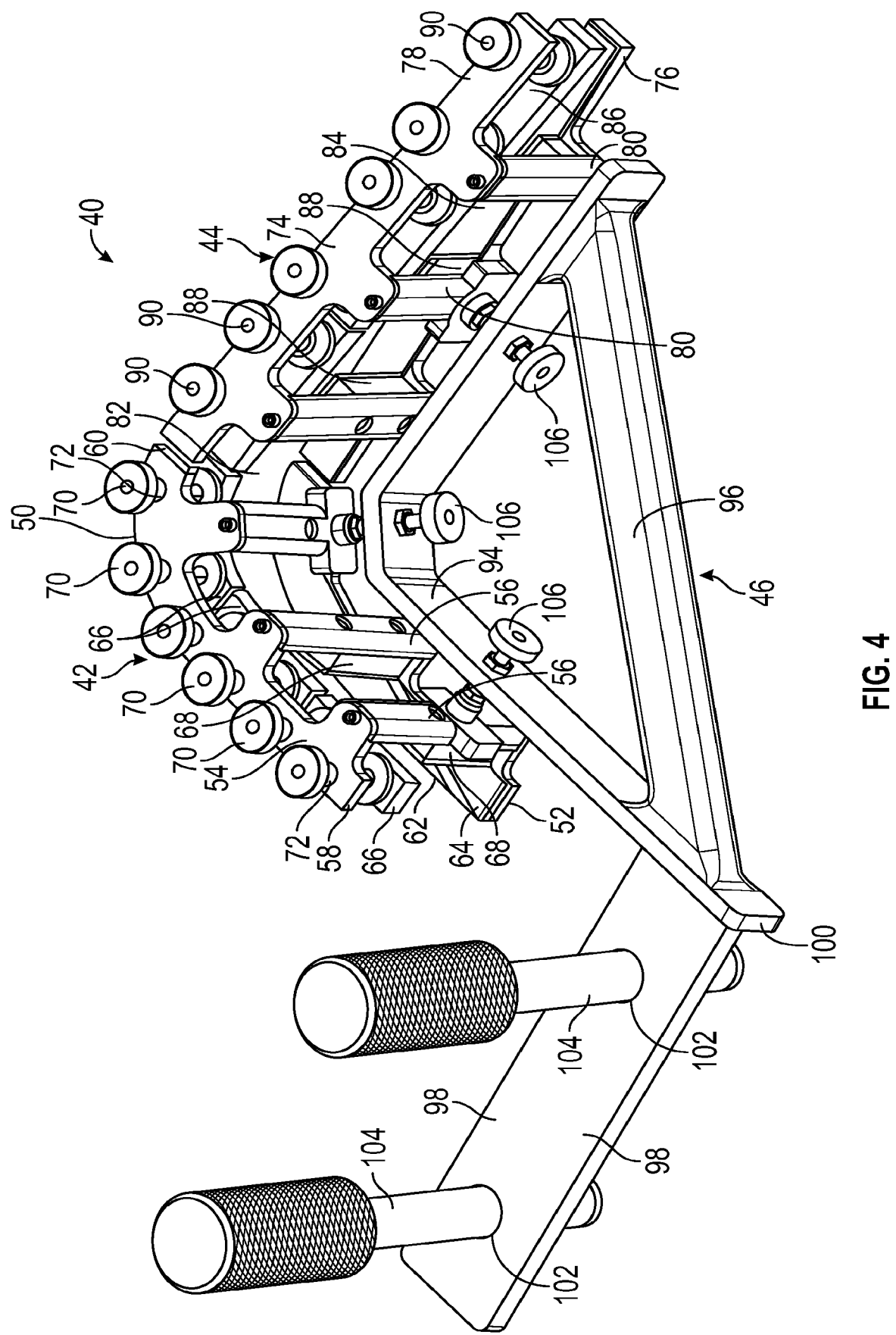
FIG. 4 is a side view of the bonding fixture of FIG. 3 according to an embodiment.
Figure 5:
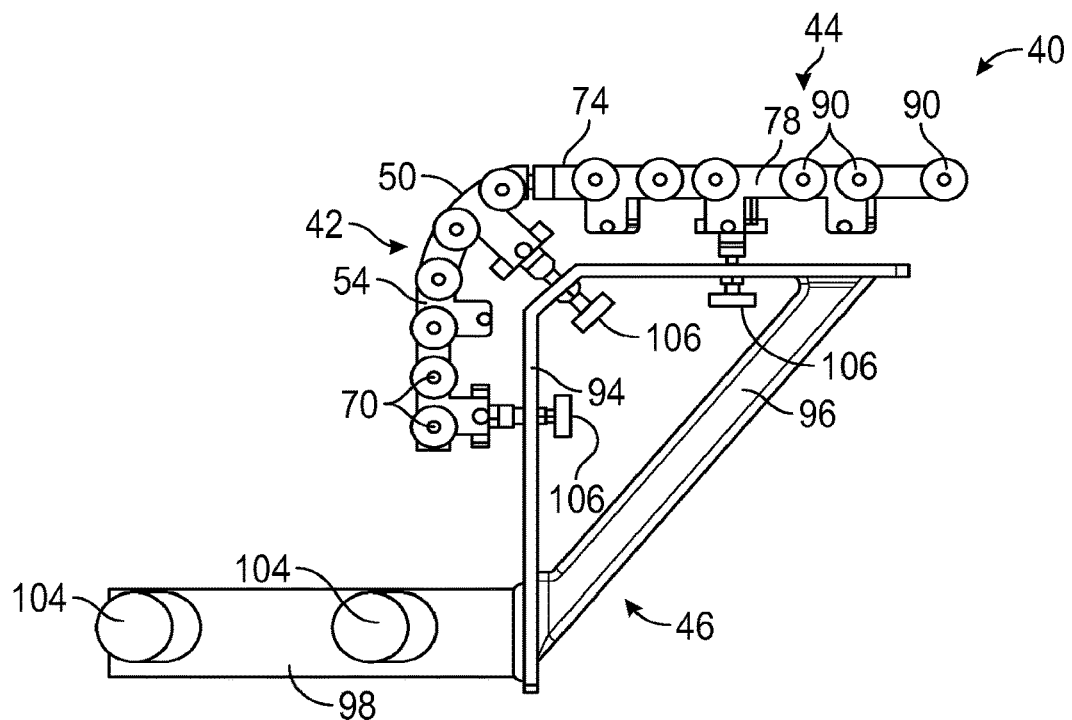
FIG. 5 is a top view of the bonding fixture according to an embodiment.
Figure 6:
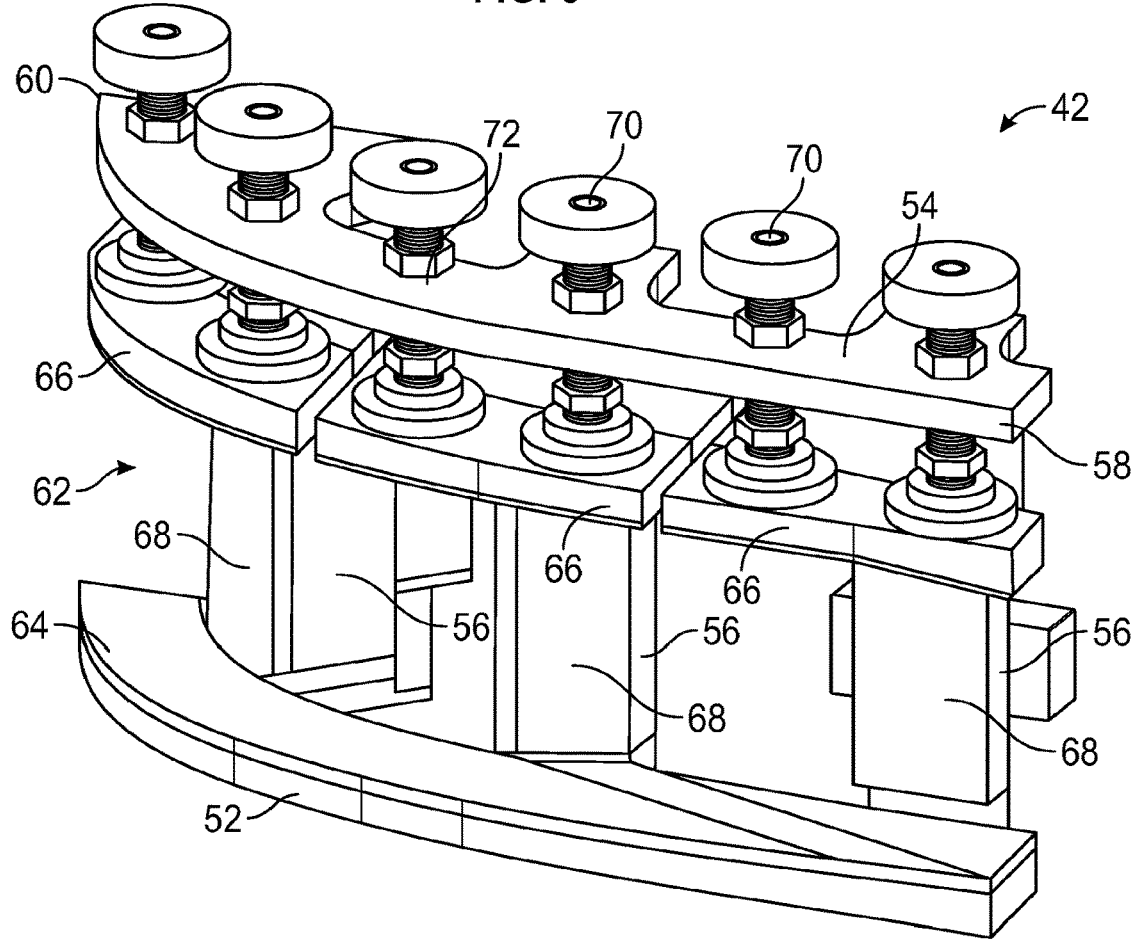
FIG. 6 is a perspective view of a first assembly of the bonding fixture according to an embodiment.
Figure 7:
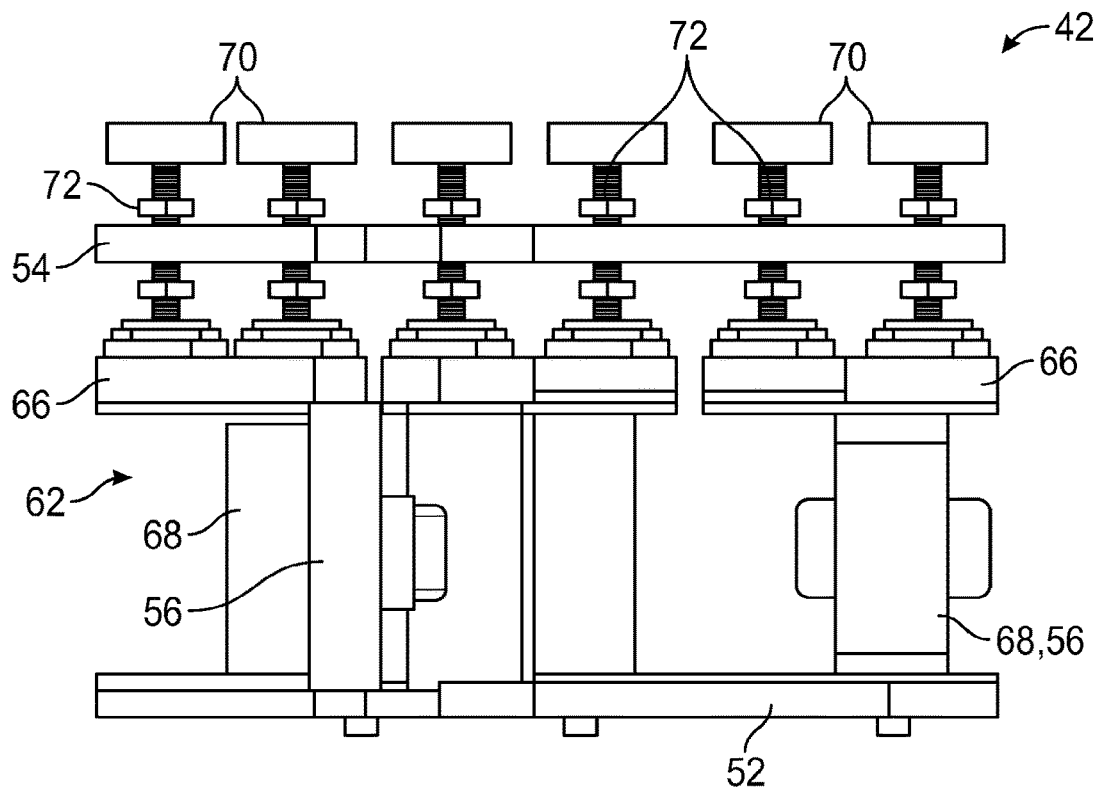
FIG. 7 is a front view of the first assembly of FIG. 6 according to an embodiment.
Figure 8:
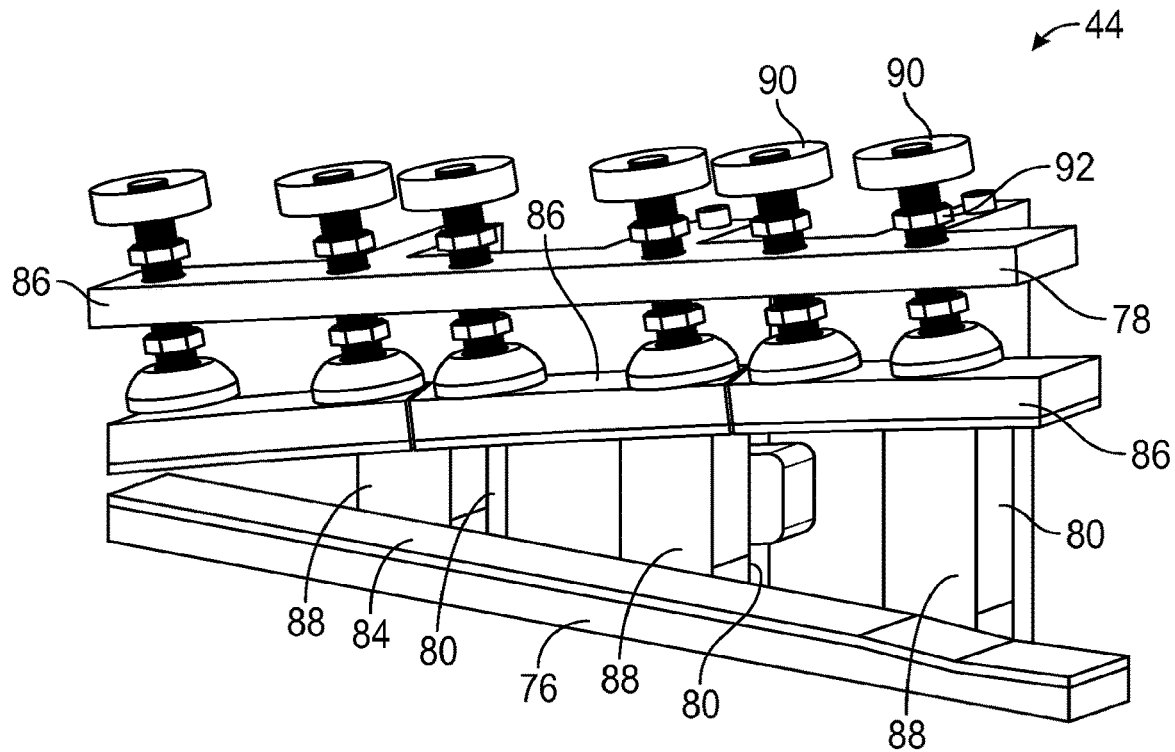
FIG. 8 is a perspective view of a second assembly of the bonding fixture according to an embodiment.
Figure 9:
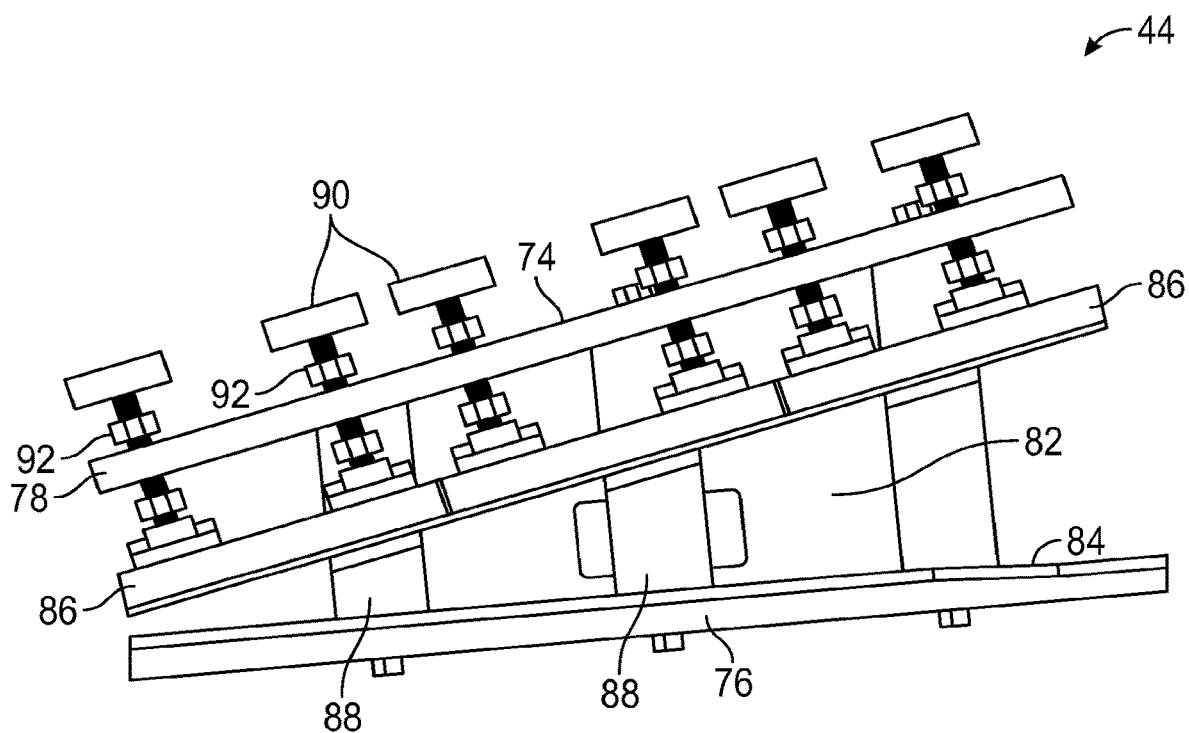
FIG. 9 is another perspective view of a second assembly of the bonding fixture according to an embodiment.

Referring to FIG. 2, each rotor blade assembly 20 of the rotor assembly 12 generally includes a root section 22, an intermediate section 24, a tip section 26, and a tip cap 28. Each rotor blade section 22, 24, 26, 28 may define particular airfoil geometries to tailor the rotor blade aerodynamics to the velocity increase along the rotor blade span. As, illustrated, the rotor blade tip section 26 may include an anhedral form (not shown); however, any angled or non-angled forms such as cathedral, gull, bent, and other non-straight forms are within the scope of the present invention. The anhedral form (not shown) as defined herein may include a rotor blade tip section 26 which extends at least partially out of a plane defined by the intermediate section 24.

The rotor blade sections 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34.

A bonding fixture 40 for bonding one or more fairings near the root end 22 of the rotor blade 20 is illustrated in FIGS. 3-10. The bonding fixture 40 includes a first assembly 42 and a second assembly 44 removably coupled to a support structure 46. The first assembly 42 is configured to mount to a first portion of the rotor blade 20, such as a portion adjacent a blade cuff 36 and extending generally parallel to the longitudinal axis of the rotor blade 20. The second assembly 44 is configured to mount to a second portion of the rotor blade 20, such as at the root end 22 extending generally parallel to the chord of the rotor blade 20 for example.

With reference now to FIGS. 3-7, the first assembly 42 includes one or more U or C-shaped frames 50 formed by a first support plate 52, a second support plate 54, and at least one connecting member 56 extending between and coupling the first support plate 52 and the second support plate 54. The first support plate 52 and the second support plate 54 may, but need not be oriented generally parallel to one another. Although the first assembly 42 is shown including a single frame 50 having three connecting members 56 extending between the first and second support plates 52, 54 in the illustrated, non-limiting embodiment, other embodiments where the first assembly 42 includes a plurality of frames 50, each of which includes only one, or alternatively, any number of connecting members 56, are also considered within the scope of the disclosure. As shown in the FIGS., a first portion of the frame 50 is generally linear and extends parallel to the longitudinal axis of the rotor blade 20, and a second portion of the frame 50 includes a radius of curvature such that a first end 58 of the first assembly 42 and the second end 60 of the first assembly 42 are not coplanar. However, it should be understood that the geometric configuration of the first assembly 42 illustrated and described herein is intended as an example only, and other configurations are also contemplated herein.

The frame 50 of the first assembly 42 defines a chamber 62 within which a portion of the rotor blade 20 including a first fairing (not shown) is positionable. A first pressure pad 64, for example formed from a resilient material, is mounted to an upper surface of the first support plate 52, within the chamber 62, such that when the bonding fixture 40 is positioned about a rotor blade 20, the first pressure pad 64 is arranged in contact with a surface of the blade 20. In an embodiment, the first pressure pad 64 has a contour generally complementary to a corresponding portion of the rotor blade 20. Further, the pad 64 may include a single pad that extends continuously over the entire upper surface of the first support plate 52, or alternatively, may include a plurality of pads spaced across or along the upper surface.

At least one second pressure pad 66 is mounted to the second support plate 54 such that the second pressure pad 66 is disposed within the chamber 62, opposite the first pressure pad 64 about a rotor blade 20. A surface of the one or more second pressure pads 66 may also be contoured to conform to a corresponding surface of the rotor blade 20 arranged in contact with the pressure pad 66. In the illustrated, non-limiting embodiment, the first assembly 42 includes a plurality of second pressure pads 66; however, embodiments including a single pressure pad 66 are also within the scope of the disclosure. Another pad 68 may be mounted to each of the connecting members 56 such that the pad 68 is generally disposed within the chamber 62. In an embodiment, each pad 68 has a contour complementary to a corresponding portion of the rotor blade 20.

The first pressure pads 64 are fixed to the first support plate 52, but each of the one or more second pressure pads 66 is movably coupled to the second support plate 54. As shown in the illustrated, non-limiting embodiment, at least one threaded fastener 70 extends from the second pressure pads 66 through the second support plate 54. Rotation of each fastener 70 relative to a nut 72 mounted to the support plate 54 may be used to adjust the position of the second pressure pad 66 relative to the second support plate 54, and therefore to control the pressure applied by the first and second pressure pads 64, 66 to the rotor blade 20. It should be understood that the threaded fastener 70 configured to adjust the position of the second pressure pad 66 is intended as an example only, and other suitable mechanisms, such as a spring loaded clamping mechanism for example, are contemplated herein. Further, embodiments where both the first pressure pads 64 and the second pressure pads 66 are movably mounted are within the scope of the disclosure.

With reference now to FIGS. 3-5, 8, and 9, the second assembly 44 is similar to the first assembly 42 in that it includes one or more U or C-shaped frames 74 formed by a first support plate 76, a second support plate 78, and at least one connecting member 80 extending between and coupling the first support plate 76 and the second support plate 78. Although the second assembly 44 includes a single frame 74 having three connecting members 80 extending between the first and second support plates 76, 78 in the illustrated, non-limiting embodiment, other embodiments where the second assembly 44 includes a plurality of frames 74, each of which includes only one, or alternatively, any number of connecting members 80, are also considered within the scope of the disclosure. As shown in the FIGS., the frame 74 of the second assembly 44 extends generally linearly.

The frame 74 of the second assembly 44 defines a chamber 82 within which a second portion of the rotor blade 20 having a second fairing (not shown) is positionable. A first pressure pad 84, for example formed from a resilient material, is mounted to an upper surface of the first support plate 76, within the chamber 82, such that when the bonding fixture 40 is positioned about a rotor blade 20, the first pressure pad 84 is arranged in contact with a surface of the blade 20. In an embodiment, the first pressure pad 84 has a contour generally complementary to a corresponding portion of the rotor blade 20. Further, the first pressure pad 84 may include a single pad that extends continuously over the entire upper surface of the first support plate 76, or alternatively, may include a plurality of pads spaced across or along the upper surface.

At least one second pressure pad 86 is mounted to the second support plate 78 such that the second pressure pad 86 is disposed within the chamber 82, opposite the first pressure pad 84 about a rotor blade 20. The surface of the one or more second pressure pads 86 may also be contoured to conform to a corresponding surface of the rotor blade 20 arranged in contact with the pressure pad 86. In the illustrated, non-limiting embodiment, the second assembly 44 includes a plurality of second pressure pads 86; however, embodiments including a single pressure pad 86 are also within the scope of the disclosure. Another pad 88 may be mounted to each of the connecting members 80 such that the pad 88 is generally disposed within the chamber 82. In an embodiment, each pad 88 has a contour complementary to a corresponding portion of the rotor blade 20.

In an embodiment, the plurality of first pressure pads 84 are fixed to the first support plate 76, but each of the one or more second pressure pads 86 is movably coupled to the second support plate 78. However, it should be understood that in other embodiments, the first pressure pads 84 may be movable while the second pressure pads 86 may be fixed, or alternatively, both the first and second pressure pads 84, 86 may be movable. Similar to the first assembly 42, at least one threaded fastener 90 may be used to movably couple the second pressure pads 86 to the second support plate. Rotation of the fasteners 90 relative to a nut 92 adjusts the position, and therefore the pressure applied by the second pressure pads 86 to the rotor blade 20.

Figure 10:
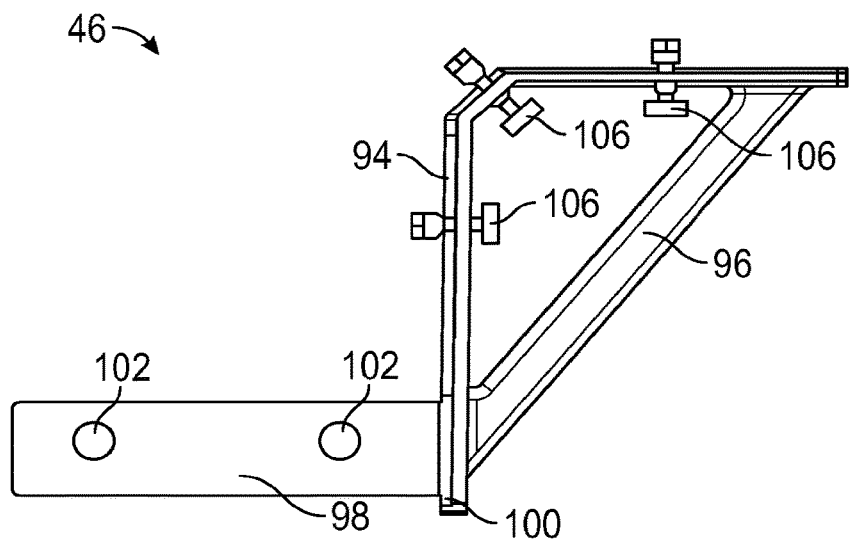
FIG. 10 is a top view of the support structure of the bonding fixture according to an embodiment.

The first assembly 42 and the second assembly 44 are configured to removably couple to a support structure 46. Referring now to FIG. 10, the support structure 46 includes a brace 94 having a contour generally complementary to both the first assembly 42 and the second assembly 44. A handle 96 extends at an angle between opposing ends of the brace 94 to provide a user with a means for easily gripping and manipulating the bonding fixture 40. A support bar 98 extends perpendicularly from a first end 100 of the brace 94. In an embodiment, the support bar 98 includes a pair of openings 102 which are used to located the fixture 40 relative to the rotor blade 20. The openings 102 are configured to align with the lug openings 38 (FIG. 3) formed in blade cuff 36 such that a pin 104 may be inserted there through.

One or more fasteners 106 may be used to selectively couple the first assembly 42 and/or the second assembly 44 to the brace 94 of the support structure. In the illustrated, non-limiting embodiment, the fasteners 106 extend through the brace 94 and are received within a portion of a corresponding connecting member 56, 80. However, other mechanisms for removably coupling the first and second assemblies 42, 44 to the support structure 46 are contemplated herein. Alternatively, or in addition, the fasteners 106 may be coupled to one or more of the pads 68, 88 mounted to the connecting members 56, 80. In such embodiments, rotation of the fasteners may be used to move the pads 68, 88 into and out of contact with the rotor blade 20, thereby controlling the pressure applied by the pads 68, 88 to the rotor blade 20.

Figure 11:
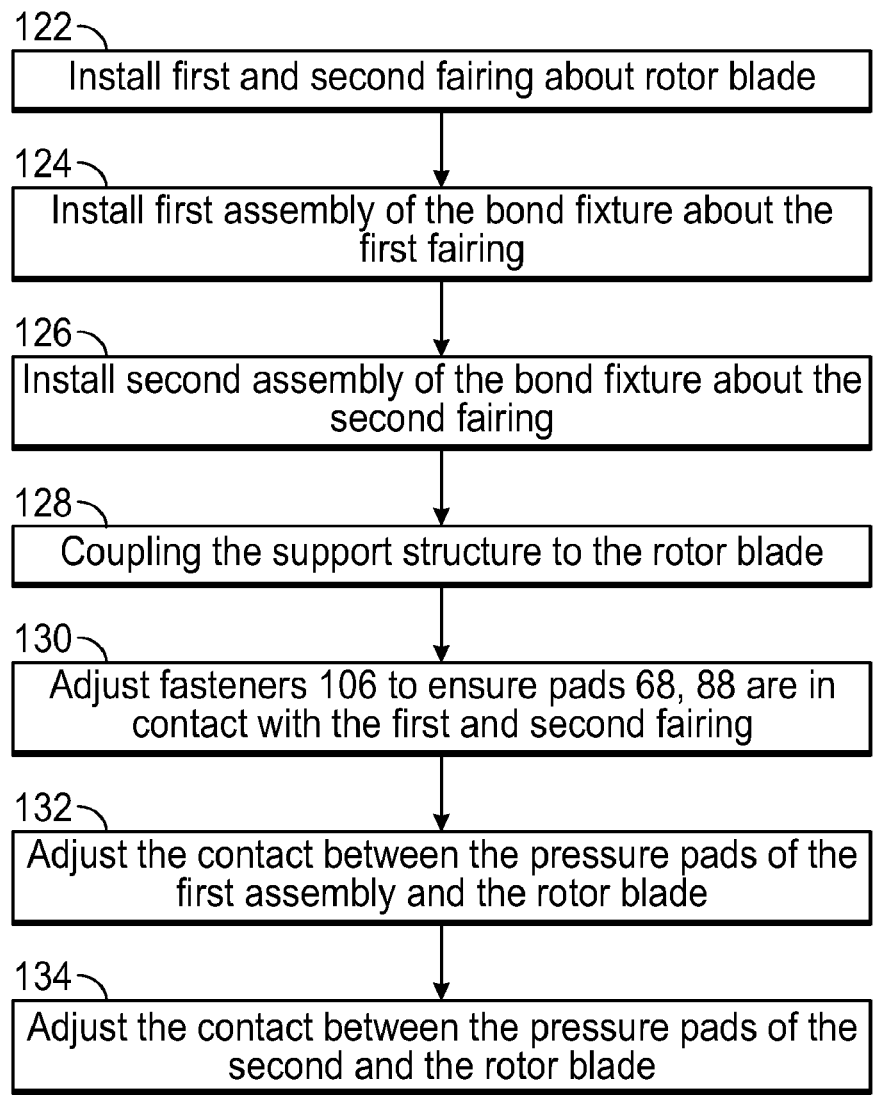
FIG. 11 is a method of bonding a first fairing and a second fairing to a rotor blade according to an embodiment.

A method 120 of bonding a first fairing and a second fairing to a rotor blade simultaneously is illustrated in FIG. 11. As shown in block 122, the first fairing is installed about the rotor blade adjacent the blade cuff 36 and the second fairing is installed at the root end 22 of the rotor blade 20 extending parallel to the chord of the rotor blade 20. In block 124, the first assembly 42 is positioned about the rotor blade at the first fairing such that the at least one first pressure pad 64 and second pressure pad 66 thereof are in contact with the rotor blade 20. Similarly, in block 126, the second assembly 44 is located about the rotor blade 20 at the second fairing. The fasteners 90 are rotated until the at least one first pressure pad 84 and second pressure pad 86 are in contact with the rotor blade 20. In block 128, the openings 102 of the support structure 46 are aligned with the lug openings 38 in the blade cuff 36 and pins 104 are inserted through the aligned openings to couple the support structure 46 to the rotor blade 20. In block 130, the fasteners 106 that couple the first assembly 42 and the second assembly 44 are adjusted to ensure that the pads 68, 88 are in contact with the first and second fairings. The fasteners 70 are adjusted in block 132 and the fasteners 90 are adjusted in block 134 to ensure that the pressure pads 64, 66, 84, 86 of the first assembly 42 and the second assembly 44 are in contact with the adjacent surfaces. This contact is maintained for a desired period of time to bond the first and second fairing to the rotor blade 20.

Due to the overlapping configuration of the first fairing and the second fairing, in some embodiments, the bonding fixture 40 may be used to bond only a second fairing. In such embodiments, the first assembly 42 need not be positioned about the rotor blade 20. Further, in such embodiments, the first assembly need not be coupled to the support structure 46. Accordingly, the method for bonding only the second fairing is similar to the method for bonding both the first fairing and the second fairing, but excludes the steps relating to positioning and adjusting the first assembly relative to the rotor blade 20.

The bonding fixture 40 illustrated and described herein provides a tool for easily bonding a first and second fairing to a rotor blade simultaneously. Further the bonding fixture 40 may be used during both the manufacture of new rotor blades and during repair of existing blades 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of bonding a fairing to a rotor blade comprising:
    installing a first fairing to a surface of the rotor blade;
    positioning a first assembly of a bond fixture about the rotor blade adjacent the first fairing;
    installing a second fairing to another surface of the rotor blade;
    positioning a second assembly of the bond fixture about the rotor blade adjacent the second fairing;
    connecting a support structure of the bond fixture to the rotor blade to restrict movement of the bond fixture relative to the rotor blade, the support structure comprising a brace including a contour complementary to the first assembly and the second assembly;
    adjusting a position of one or more pressure pads of the first assembly;
    applying localized and constant pressure to the first fairing via the bond fixture; and
    adjusting one or more fasteners to contact at least one of the one or more pressure pads of the first assembly or at least one of the one or more pressure pads of the second assembly with the rotor blade.

2. The method of claim 1, further comprising:
    adjusting a position of one or more pressure pads of the second assembly; and
    applying localized and constant pressure to the second fairing via the bond fixture.

3. The method of claim 1, wherein localized and constant pressure is applied to the first fairing and the second fairing simultaneously.

4. The method of claim 1, further comprising aligning openings of the support structure with openings of a blade cuff.

5. The method of claim 4, further comprising inserting pins through the aligned openings to couple the support structure to the rotor blade.

6. A method of bonding a fairing to a rotor blade comprising:
    installing a first fairing to a surface of the rotor blade;
    positioning a first assembly of a bond fixture about the rotor blade adjacent the first fairing;
    installing a second fairing to another surface of the rotor blade;
    positioning a second assembly of the bond fixture about the rotor blade adjacent the second fairing;
    connecting a support structure of the bond fixture to the rotor blade to restrict movement of the bond fixture relative to the rotor blade, the support structure comprising a brace including a contour complementary to the first assembly and the second assembly;
    adjusting a position of one or more pressure pads of the first assembly;
    applying localized and constant pressure to the first fairing via the bond fixture; and
    aligning openings of the support structure with openings of a blade cuff.

7. The method of claim 6, further comprising inserting pins through the aligned openings to couple the support structure to the rotor blade.

8. The method of claim 6, further comprising:
    adjusting a position of one or more pressure pads of the second assembly; and
    applying localized and constant pressure to the second fairing via the bond fixture.

9. The method of claim 8, further comprising contacting at least one of the one or more pressure pads of the first assembly and the one or more pressure pads of the second assembly with the rotor blade.

10. The method of claim 6, wherein localized and constant pressure is applied to the first fairing and the second fairing simultaneously.

* * * * *